May 31, 1932.　　J. A. McCASKELL　　1,860,937
CONTINUOUS FILTER
Filed Sept. 28, 1929　　3 Sheets-Sheet 1

INVENTOR
Jasper A. McCaskell
BY
ATTORNEYS

May 31, 1932.  J. A. McCASKELL  1,860,937
CONTINUOUS FILTER
Filed Sept. 28, 1929   3 Sheets-Sheet 2
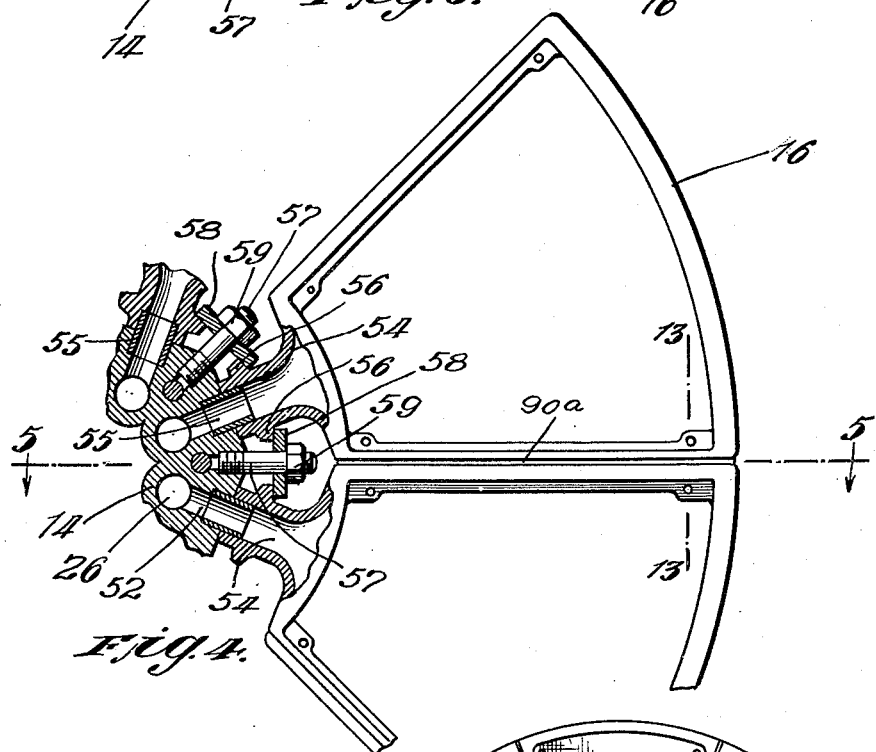
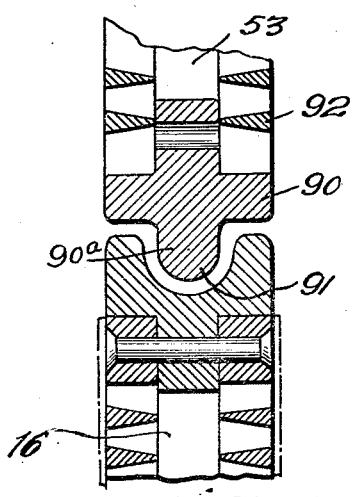
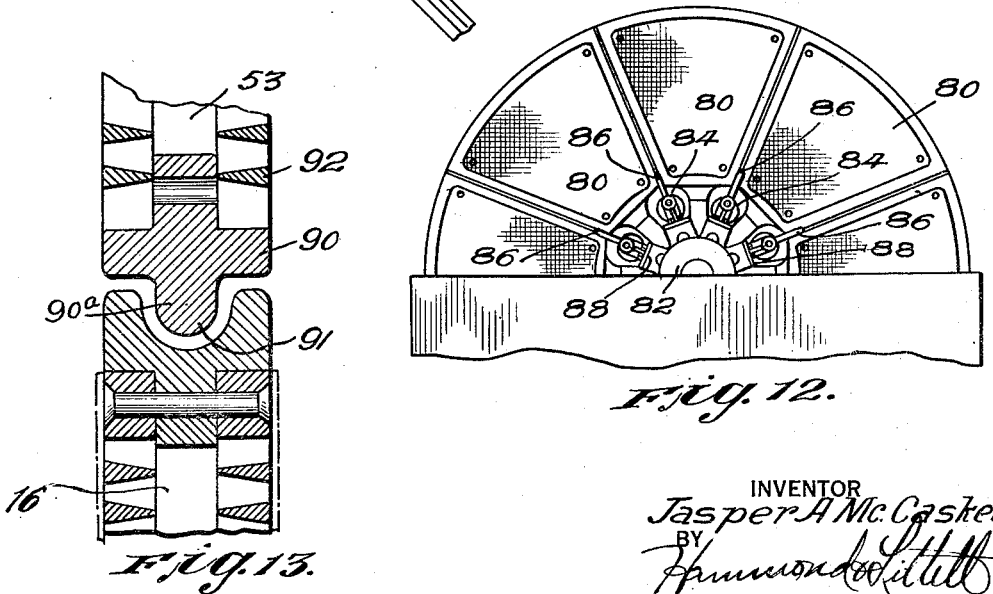
INVENTOR
Jasper A. McCaskell
BY
ATTORNEYS

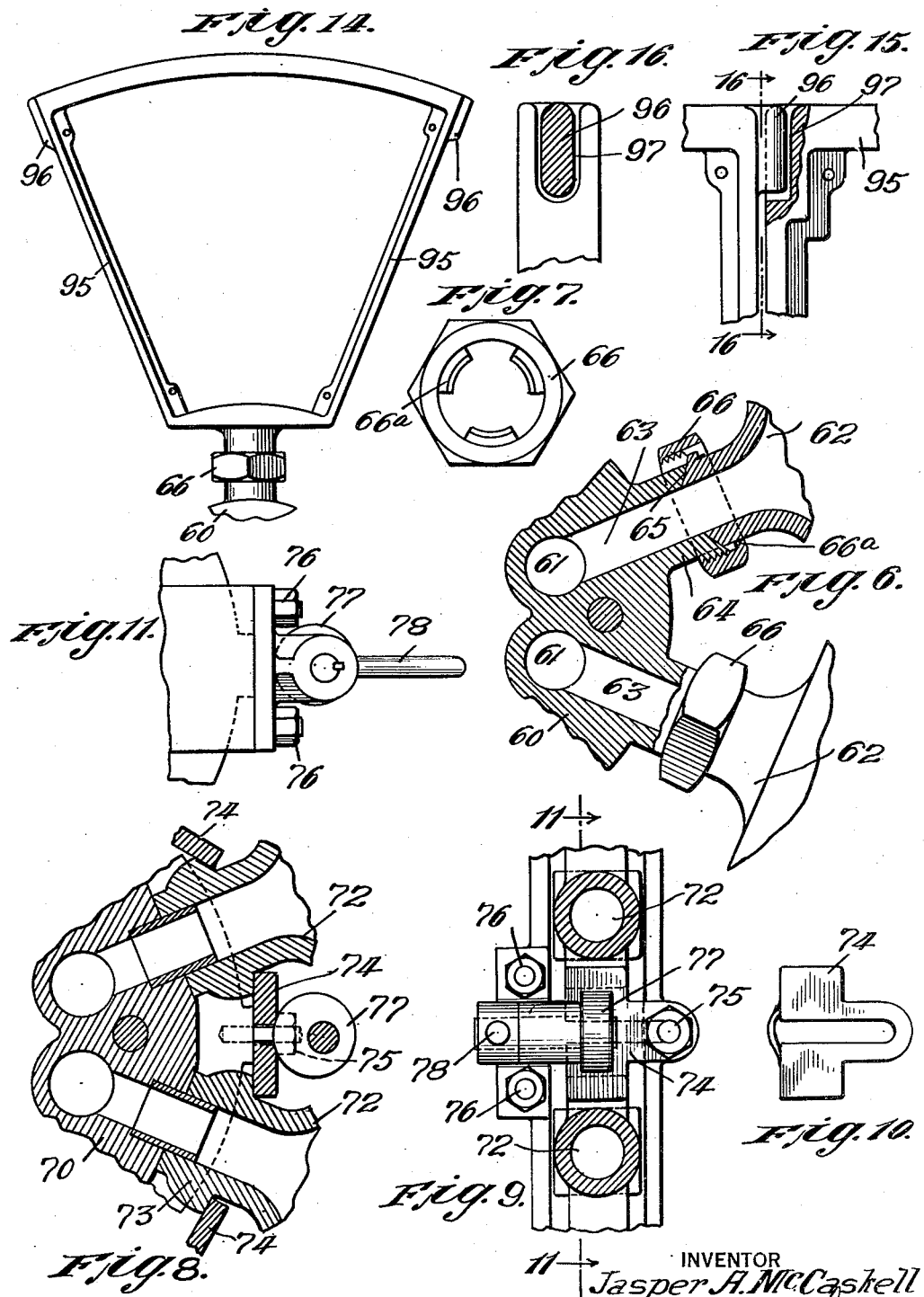

Patented May 31, 1932

1,860,937

UNITED STATES PATENT OFFICE

JASPER A. McCASKELL, OF SALT LAKE CITY, UTAH

CONTINUOUS FILTER

Application filed September 28, 1929. Serial No. 395,798.

This invention relates to improvements in continuous filters and particularly relates to improvements in the filter leaf construction and operation in a disc filter.

One of the objects of this invention is to provide improved means for securing the filter leaves in a disc filter to the central filter shaft to permit more easily replacing and renewal of the filter leaves without sacrifice to rigidity.

Another object of this invention is to provide a disc filter with quickly detachable filter segments which are adapted to be removed and resecured to the shaft by the minimum of operation and the maximum of security.

Another object of my invention is to provide a drip launder for disc filters of the continuous type to permit washing of the filter cake on the filter leaf without dilution of the filter pulp and to materially improve filter operation.

Another object of the invention is to provide an improved means for securing filter leaves to the filter shaft and to each other whereby the filter segments will run with less wabbling and warping and be more quickly secured or removed from the shaft.

Another object of the invention is to provide an attachment for securing of the filter segments in a longitudinal row by the operation of a single control shaft.

A further object of my invention is to provide filter leaf securing means in filter disc construction, between adjacent filter leaves to bring about more uniformity of rotation and economy in manufacture and ease of maintenance.

Further objects of my invention will appear from the following description thereof taken in connection with the attached drawings which illustrate preferred forms of embodiment thereof and in which Figure 1 is a central vertical section thru my improved filter.

Figure 4 is a partial cross section of the filter shaft showing the attachment of the filter leaves.

Figure 5 is a sectional view on the line 5—5 in Figure 4.

Figure 6 is a partial cross sectional view of the filter shaft showing a modified form of attachment of the filter leaves.

Figure 7 is a detailed view of the quick acting nut shown in Figure 6.

Figure 8 is a view similar to Figure 6 showing a still further modified form of securing the filter leaves to the filter shaft, the construction shown in Figure 8, Figures 9, 10, and 11 are further details of the construction shown in Figure 8, Figure 11 being taken on the line 11—11 of Figure 9.

Figure 12 is an end view of the filter showing a still further modified form of securing the filter leaves to the shaft.

Figure 13 is a cross section on the line 13—13 in Figure 4, showing the slotted connection between the adjacent filter leaves.

Figure 14 is a plan view of a modified form of a filter leaf frame.

Figure 15 is a partially broken away plan view of adjoining filter leaves showing a modified form of connection.

Figure 16 is a detail section along the line 16—16 of Figure 15.

Figure 1:
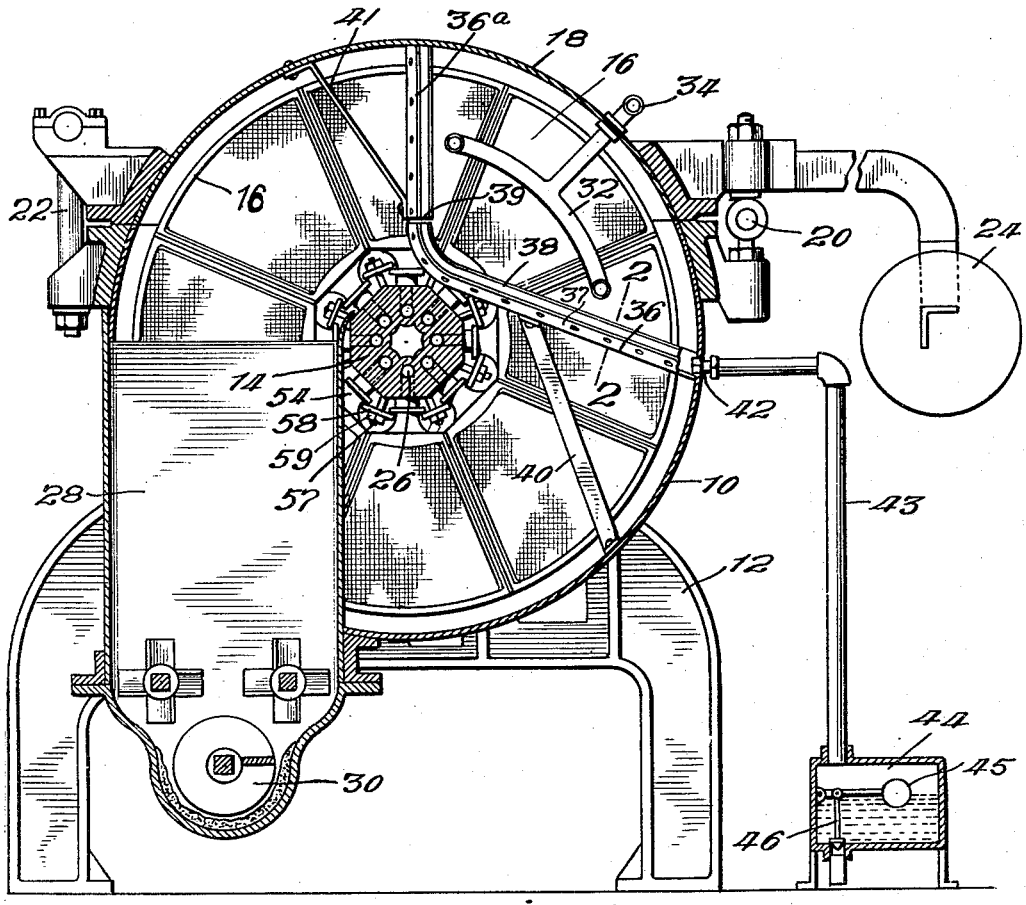

A continuous pressure filter as shown in Fig. 1 comprises as principal parts, the filter casing 10, supported on legs 12 and having the filter shaft 14 to which the filter segments 16 are secured to form filter leaves. The filter shaft usually carries a plurality of such leaves along the length thereof. The upper half 18 of the casing 10 is herein shown to be pivoted at the pivot 20 and secured by bolts 22 on the opposite side. A counter weight 24 aids the opening of the filter casing.

In such a filter, the bottom half of the casing 10 is kept filled with a filter pulp to the desired level and air or other gas under pressure is forced into the upper portion of the casing so that the difference between the high pressure in the filter casing and the atmospheric pressure in the filtrate conduits 26 causes the filter pulp to build up on the outside of the filter segments and forces the filtrate out of the filter through the conduits 26 to appropriate valves as is well known in the art. The filter cake which builds up on the filter element 16 is removed by a suitable cake removing mechanism and is discharged into a discharge compartment 28 by and by means of a screw conveyor 30 is removed from the filter casing under conditions which prevent the escape of the filter pressure. This is all a well-known construction as shown in my prior Patent No. 1,266,133, granted May 14, 1918.

In such constructions it is often found desirable to wash the filter cake for the primary purpose of washing the soluble contents out of the cake and this is done by the use of suitable nozzles 32 which are connected to the wash water inlet 34 which receives water or other washing fluid under higher pressure than the filtration pressure. In the prior constructions, however, the wash water was allowed to pass between the filter discs into the bottom of the casing and diluted the filter pulp. The excess water necessary to properly wash the cake, lessen the percentage of solids in the pulp and the dilution of the pulp decreased the efficiency of filtration. As is readily understood, the greater the percentage of solids that can be carried in a pulp, the higher the efficiency of filtration obtained under normal circumstances. If the pulp is diluted, the tendency is for the solid particles to settle out thus causing a thin cake to build up near the central shaft on the filter leaves and a thick cake to form around the periphery of the filter leaves. This non-uniform cake can only be imperfectly washed due to the short circuiting of the wash water thru the thinner portion of the cake and imperfectly washing the thicker portion of the cake. It is one of the purposes of my present invention to overcome this difficulty by using a drip launder 36 which is a substantially trough-shaped metallic plate as particularly shown in Fig. 2 having outwardly and upwardly projecting flanges 37 thereon. Wiping elements 38 preferably formed of rubber are secured to the flanges 37 and extend substantially to the adjacent filter leaves 16, being sufficiently flexible to permit passage of the cake 16 without scraping it from the leaves. The launder 36 with the vertical leg 36a forms substantially a quadrant and the lower leg 36 slopes from a point above the shaft to the wall of the casing so that the water will drain therefrom by gravity into the conduits 42 and effectively prevents the wash fluid from the nozzles 32 from draining into the lower part of the filter casing and diluting the filter pulp therein.

Figures 2, 3:
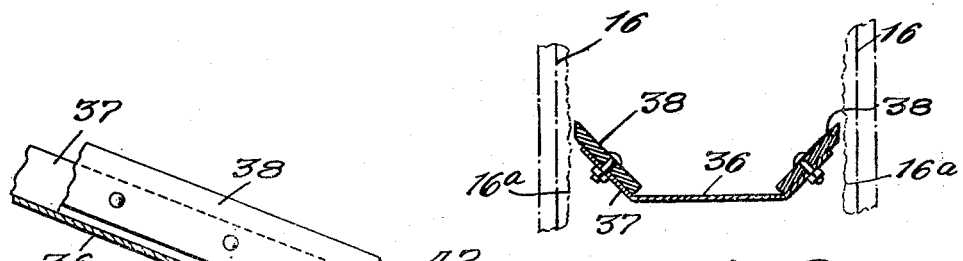
Figure 2 is a cross section on the line 2—2 in Figure 1 showing the drip launder.
Figure 3 is a vertical section at 90° to Figure 2 thru the end of the drip launder showing the main connection.

In the particular construction of split casing shown herein, it is necessary that the drip launders be divided on the line of the upper half of the casing at the point 39 so as to permit opening of the casing. The lower half of the launders 36 are therefore secured and supported by the uprights 40 to the lower half of the casing 10, whereas the upper parts 36a of the launders are secured to the upper portion of the casing 18 by the supports 41. The lower end of the drip launders 36 are provided with couplings 42 which project thru the casing as shown in Fig. 3, and are connected to the pipes 43 by which the wash water is conducted to the wash water trap 44, constructed to permit escape of the fluid therefrom without permitting escape of the filter pressure.

A trap such as shown in 44 is essential because of the necessary high pressure in the filter and under which the wash water is operated. A suitable float valve 45 is provided which is operated by the amount of water in the trap and only sufficient water is allowed out of the trap by operation of this float valve 45 to compensate for the increase in water from the drip launder. With such a construction, the variations in pressure have no effect on the water level and the pressure is thus not diminished. The discharge valve 46 is pivoted on the float valve arm 45 to permit the final discharge of water.

It is to be understood that steam, high pressure or a solution of any washing medium may be effectively used in the spray nozzles in the wash water pipe 32 and by the use of the drip launder, the surplus liquids will be drained off into the discharge trap 44 without loss of pressure and without diluting the filter pulp.

In cooperating with this improvement in launders I have also provided an improved connection between the filter leaves and the filter shaft which is particularly shown in Figures 4 and 5. The filter shaft 14 is provided with the usual filtrate ports 26 having outwardly extending radial conduits 52 to which the filter leaves 16 are secured. The filter leaves 16 are preferably of the segmental type and each segment closely adjoin the adjacent segments in the leaf. These segments are provided with neck shaped ends 54 and cooperate with the exterior of the filter shaft. A nipple 55 is provided between the filter shaft 14 and the neck 54 of the filter segment to insure a tight joint and prevent leakage and the neck has short projections 56 extending from each side thereof. Bolts 57 placed between adjoining filter segments are secured in said filter shaft 14 and clamp washers 58 retained by nuts 59 on the end of said bolts cooperate with the projections 56 on adjoining filter segments so that by properly tightening the nuts 59, the segments may be suitably secured to the filtrate shaft. The collar 14a on the filtrate shaft 14 projects beyond the edge of the filter leaves and maintains their alignment at the base by engaging each side of the segments. By loosening the nuts 59 and turning the washers 58 at right angles, the segments 16 may be readily removed from the shaft.

A modified form of device for securing the filter leaves to the filtrate shaft is shown in Figs. 6 and 7. This particularly includes the filter shaft 60 having the filtrate ports 61 adapted to drain the filter segments 62 thru the filtrate conduit 63. A bushing 64 integral with the filtrate shaft is provided with a countersunk ground end 65 with which the filter segments 62 cooperate. A quick acting nut 66 provided with spaced lugs 66a as shown in Fig. 7, cooperates with threaded portions of the bushing 64 and with cooperating lugs on the neck of the filter segments 62. By turning the nut ⅛th of a turn, these particular sectors may be quickly loosened or secured so that they may be replaced with facility.

A still further modification of securing means is shown in Fig. 8 in which the filter shaft 70 is adapted to receive the filter segments 72 which have projections 73 thereon. Intermediate adjacent sectors 72, is a removable plate 74 of substantially U-shape as shown in Fig. 10 which is adapted to be slid past a retaining bolt 75 mounted on the filter shaft. Suitably mounted on the filter shaft by bolts 76 is an eccentric 77 having an arm 78 as shown in Fig. 11.

In operation, the adjoining segments 72 are placed in position adjacent the filter shaft with the nipples in place. The U-shaped plate 74 is then slid under the retaining bolt 75 retaining all the segments temporarily in position and then the operating arms 78 of the eccentrics 77 for each segment are rotated forcing the eccentric surface against the retaining plate 74 which in turn cooperates with the projections 73 on the segments and secures them to the filter shaft. This also is a quick acting method for securing the filter segments to the filtrate shaft and is particularly adapted for preliminary positioning of all the filter segments and the final locking of the filter segments to the shaft.

A still further modified form of securing the filter leaves is shown in Fig. 12 which is similar in some respects to that shown in Fig. 8. In this construction, however, a single shaft extends between adjoining segments of the filter leaf throughout the length of the filter shaft and all the segments in a single row are secured by a single operation of the locking arm. The segments 80 are secured to the filter shaft 82 and the locking mechanism 84 extends the length of the shaft 82 and between the segments 80. The locking mechanism comprises a cam and an operating arm 86, one cam being provided for each leaf in the filter. A plate 88 is provided with a depressed surface to receive the eccentric of the cam and this plate abuts appropriate projections on adjoining filter segments 80. As the sectors are placed in position, the plates are placed over the projections and the eccentric is then rotated to simultaneously secure all the sectors in a particular row to the filter shaft.

The sides of the segments of the filter leaves are preferably formed with corrugations as particularly shown in Fig. 13, to prevent misalignment thereof. In this figure adjacent segments have been shown, the frames 90 of which are provided with projecting ribs 90a cooperating with the groove 91 along the radial line of the adjacent segment. The tongue 90a and groove joint 91 permit the leaves to be of greater area as the tie rods customarily used have been omitted. The tongue and groove joint also prevents misalignment and wabbling of the filter leaves during rotation and thus permits the filter cake discharging mechanism to operate more satisfactory. Tongue and groove joints can be made on each filter leaf segment or one filter leaf segment may be provided with two tongues and the adjoining segments may be provided with two grooves.

By doing away with the usual tie rods, a radial thrust which ordinarily causes warping of the segment frames is prevented and the irregular movement of the leaves which is characteristic of the radial bolts heretofore used is absent because there is no circumferential strain on the rim of the filter leaf. The grids 92 which support the filter bag are secured to the frames 90 in any preferred manner such as by countersunk bolts, rivets or other means.

A modification of the filter leaf is shown in Fig. 14 in which the frames 95 are provided with tongue and groove projections 96 and 97 respectively. In this modification, the tongue extends but a very short distance along the radial length of the sector and similarly the groove will be formed only adjacent the end of the filter leaf. This construction is shown in greater detail in Fig. 15 in which part of the filter segment 95 is broken away to show the groove 97. The overlap of the groove 97 on the tongue 96 is shown in Fig. 16 and it is to be noted that this over-lap is sufficient to keep the filter segments in vertical alignment and to permit the filter leaf to rotate without wabbling or distortion.

The filter construction shown herein thus embodies substantial improvements in the continuous filter construction not only in the launder which effectively prevents pulp dilution and increased filter efficiency by also improvements in the filter segment supports so that segments may be removed more quickly and replaced more securely with the minimum of labor. The improved filter also obviates irregularity of motion as the common radial bolts are omitted and radial ribs cooperating with adjacent radial grooves are used, and keep the segments in alignment without causing warping. The leaves therefore are more rigid and have greater areas due to the advantage in using radial tongue and groove joints and securing them at their base to the shaft and the objectionable circumferential strains are not set up. Supporting the launder in the cantilever casing as disclosed is effective to permit opening of the casing for inspection and as the casing opens on a line above the usual pulp level, no pulp is lost if it is opened while filled. The entire construction thus embodies features of improvement, all of which increase the filter efficiency. It is of course obvious that these features might equally as well be used in connection with continuous vacuum filters such as shown for example in United States Letters Patent #1,259,139, granted March 12, 1918, to Orange J. Salisbury, as the present form of pressure filters. Vacuum filters have similar filter leaves and filtrate shafts and if the upper part of the casing were removed from the present disclosed filter, the corresponding vacuum filter would be shown.

While I have described preferred forms of embodiment of my invention, I am aware that other modifications may be made therein and I therefore desire protection commensurate with the scope and spirit thereof and as claimed in the claims appended hereinafter.

I claim:

1. In a continuous rotary filter having a filter shaft and filter leaves secured to said shaft, filter segments forming said filter leaves, said segments having neck portions and short bolts limited by said neck portions said short bolts engaging the said filter segments at said neck portions for securing said filter leaves to said filter shaft.

2. In a continuous rotary disc filter of the class described, the combination of a plurality of adjoining filter segments adapted to form a filter leaf, said filter segments having interlocking tongue and groove joints along the radial edges of said segments, said filter segments being provided with neck-shaped ends adjacent said filter shaft and adapted to communicate with the passage therein, projections adjacent said ends and quick actuating means cooperating with said projections to secure said segments to said shaft.

3. In a continuous rotary filter of the class described, filter leaves formed of separate filter segments, each of said filter segments having interlocking members along each radial edge thereof adapted to cooperate with the interlocking members of adjacent segments to maintain the planar alignment of all of said segments and prevent movement out of any segment out of the normal plane of the leaf.

4. In a continuous rotary filter of the class described, a filter shaft, a plurality of filter segments forming leaves on said shaft, each of said filter segments having a tongue on one radial edge and a groove on the other radial edge adapted to cooperate with the corresponding projections on an adjacent segment to maintain the planar alignmment of said leaves, said segments having a neck shaped inner end and means engaging the inner end of said segments for rapid attachment of said segments to said filter shaft.

5. In a continuous rotary filter of the class described, a filter shaft, filter segments forming leaves on said shaft, said filter segments having a narrow projection from the edges thereof adapted to cooperate with an adjacent segment to maintain the vertical alignment of said leaves, said segment having a neck-shaped inner end and means adjacent said inner end for rapid attachment of said segment to said filter shaft, said means comprising a collar cooperating with the adjacent segments and bolt mechanism to cause the collars to clamp the segments to the shaft.

6. A rotary filter of the class described comprising a rotatable filter shaft, a plurality of segmental filter elements adapted to form a continuous filter leaf, said filter elements having reduced necks and means to secure said elements to said shaft to avoid peripheral strain and warping, said means including a bolt actuated device, said device engaging said reduced neck and said shaft.

7. In a continuous rotary filter of the class described, means for securing filter segments to the filter shaft which comprises a restricted neck portion on said filter segments, filtrate openings extending from said shaft, projections on said neck portion of said filter segments, collar means extending over projections on adjacent filter segments and bolts projecting into said filter shaft adjacent said collar to secure said segments adjacent said filtrate openings.

8. The combination of a continuous rotary filter having a filter shaft and segmental filter leaves secured thereto of a quick actuating mechanism adapted to secure said segmental filter leaves to said filter shaft comprising bolts projecting from said filter shaft, projections extending from said filter segments adjacent the point of contact with said filter shaft, retaining collars cooperating with said projections, and secured to said bolts and collar means extending from said filtrate shaft and contacting with said elements to align said segments.

9. In a rotary filter of the class described, in combination with a filter shaft and a plurality of segmental filter sections adapted to be secured thereto to form a filter leaf, said filter sections having a reduced neck portion of securing means contacting with said neck portion and said shaft to secure said sections to said shaft without peripheral strain.

10. In a rotary filter of the class described, in combination with a filter shaft, a plurality of filter sectors adapted to be secured thereto, said sectors having reduced neck portions forming a space therebetween at said shaft and means for solely securing said sectors to said shaft, said securing means including a bolt mounted in said filter shaft in the space between adjacent filter segments, a projection on said reduced neck portion and means engaging said neck portion and the bolt in said space to secure the filter sectors to said shaft.

11. In a rotary filter of the class described, in combination with a filter shaft, a plurality of filter sectors adapted to be secured thereto, said sectors having reduced neck portions and means to secure said sectors to said shaft, said securing means including a bolt mounted in said filter shaft adjacent between each filter segment and a projection on said reduced neck portion and means cooperating with said bolt and said neck portion for solely securing said sector to said shaft and tongue and groove joints on adjacent filter segments co-extensive with the adjoining radial edges thereof.

12. In an apparatus of the class described, the combination with a filter shaft, a plurality of filter segments adapted to form a continuous thin leaf thereon said segments having a reduced drainage neck forming securing spaces and cam actuated means located in said securing spaces solely adjacent the shaft for securing said leaves to said filter shaft and avoiding peripheral warping.

13. Quick detachable means for securing a filter segment of a leaf in a continuous filter to a filter shaft comprising a countersunk projection on said filter shaft, a cooperating neck on said filter segment and a quick actuating nut having a mutilated thread for securing said segment to the shaft with less than one full turn.

14. In a continuous rotary disc filter of the class described, the combination with a filter shaft of a plurality of filter segments adapted to form a single leaf and cam actuated means mounted between said segments for securing said segments to said shaft, said cam actuated means including a collar cooperating with said adjacent filter segments at a point closely adjacent to said filter shaft, said collar being of U-shape and adapted to be displaced when said cam is released whereby said adjacent segments may be removed.

15. In a continuous rotary filter of the class described, a filter shaft, filter segments form leaves on said shaft, said filter segments having a narrow projection from the edges thereof adapted to cooperate with an adjacent segment to maintain the vertical alignment of said leaves, said segment having a neck-shaped inner end and means adjacent said inner end for rapid attachment of said segment to said filter shaft, said means comprising a collar cooperating with the adjacent segments and cam mechanism to cause the collars to clamp the segments to the shaft, said collar being of U-shape and adapted to be secured against removal from said filter shaft, said collar being adapted to be moved into segment releasing position.

16. In a filter of the class described having a central shaft and a plurality of filter segments adapted to be secured thereto, means for securing said filter segments to said shaft, said filter segments having enlarged portions closely adjacent said filter shaft, said securing means including a member mounted on said enlarged portions, a standard mounted on said shaft between adjacent filter segments and means mounted on said standard and adapted to contact with said member, said member adapted to be forced into firm contact with said enlarged portions of said segments whereby said segments are secured to said filter shaft solely by said securing means to prevent peripheral warping.

In testimony whereof I have affixed my signature to this specification.

JASPER A. McCASKELL.